US007484122B2

(12) United States Patent
Natarajan et al.

(10) Patent No.: US 7,484,122 B2
(45) Date of Patent: Jan. 27, 2009

(54) CONTROLLING TIMING OF EXECUTION OF TEST INSTRUCTION BY TARGET COMPUTING DEVICE

(75) Inventors: Subram Natarajan, Portland, OR (US); Manoj K. Negi, Beaverton, OR (US); Juan C. Gomez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/872,211

(22) Filed: Jun. 17, 2004

(65) Prior Publication Data

US 2005/0283670 A1 Dec. 22, 2005

(51) Int. Cl.
*G06F 11/00* (2006.01)
*G06F 11/22* (2006.01)
(52) U.S. Cl. .............................. 714/31; 714/25; 714/48
(58) Field of Classification Search .................... 714/25, 714/31, 48
See application file for complete search history.

(56) References Cited

U.S. PATENT DOCUMENTS

| 5,701,488 | A | * | 12/1997 | Mulchandani et al. ...... 717/128 |
| 5,740,398 | A | | 4/1998 | Quattromani et al. |
| 5,905,998 | A | | 5/1999 | Ebrahim et al. |
| 5,926,645 | A | | 7/1999 | Williamson |
| 5,931,953 | A | * | 8/1999 | Lesmeister .................. 713/500 |
| 6,108,721 | A | | 8/2000 | Bryg et al. |
| 6,138,249 | A | * | 10/2000 | Nolet .......................... 714/25 |
| 6,182,238 | B1 | * | 1/2001 | Cooper .......................... 714/2 |
| 6,269,433 | B1 | | 7/2001 | Jones et al. |

(Continued)

OTHER PUBLICATIONS

How to kill Orphaned/Runaway processes version from Apr. 30, 2004, found via www.archive.org http://web.archive.org/web/20040430120540/http://www.cs.sfu.ca/CC/CSILUnix/runaways.html.*

(Continued)

*Primary Examiner*—Scott T. Baderman
*Assistant Examiner*—Joseph Schell
(74) *Attorney, Agent, or Firm*—Steven Lieske Bennett

(57) ABSTRACT

Controlling the timing of execution of test instructions by a target computing device is disclosed. A method initiates a test process at each target computing device. The method receives a process handle of the test process from each target computing device, as generated at the target computing device. The method repeats sending to each target computing device the process handle of the test process, and a test instruction to be executed at the target computing device, until the target computing device has finished executing all the test instructions. A test instruction may be a test script made up of a number of test commands that are to be executed as a group, or a test instruction may be a single test command. Timing of execution of each test instruction can be controlled by deciding when to send the test instruction to a target computing device.

18 Claims, 8 Drawing Sheets

U.S. PATENT DOCUMENTS

| | | |
|---|---|---|
| 6,421,775 B1 | 7/2002 | Brock et al. |
| 6,636,933 B1 | 10/2003 | MacLellan et al. |
| 7,020,722 B2 * | 3/2006 | Sivier et al. ............... 709/248 |
| 7,159,021 B2 * | 1/2007 | Boldman et al. ............ 709/223 |
| 7,165,189 B1 * | 1/2007 | Lakkapragada et al. ....... 714/31 |
| 7,165,256 B2 * | 1/2007 | Boudnik et al. ............. 718/104 |
| 7,401,259 B2 * | 7/2008 | Bhowmik et al. ............. 714/31 |
| 2003/0023782 A1 | 1/2003 | Arimilli et al. |
| 2004/0199815 A1 * | 10/2004 | Dinker et al. ................. 714/21 |
| 2005/0022194 A1 * | 1/2005 | Weir et al. ................... 718/100 |

OTHER PUBLICATIONS

Transmission Control Protocol—DARPA Internet Program Protocol Specification Sep. 1921, Defense Advanced Research Projects Agency, Information Processing Techniques Office Full text available at: http://isc.faqs.org/ftp/rfc/pdf/rfc793.txt.pdf.*

* cited by examiner

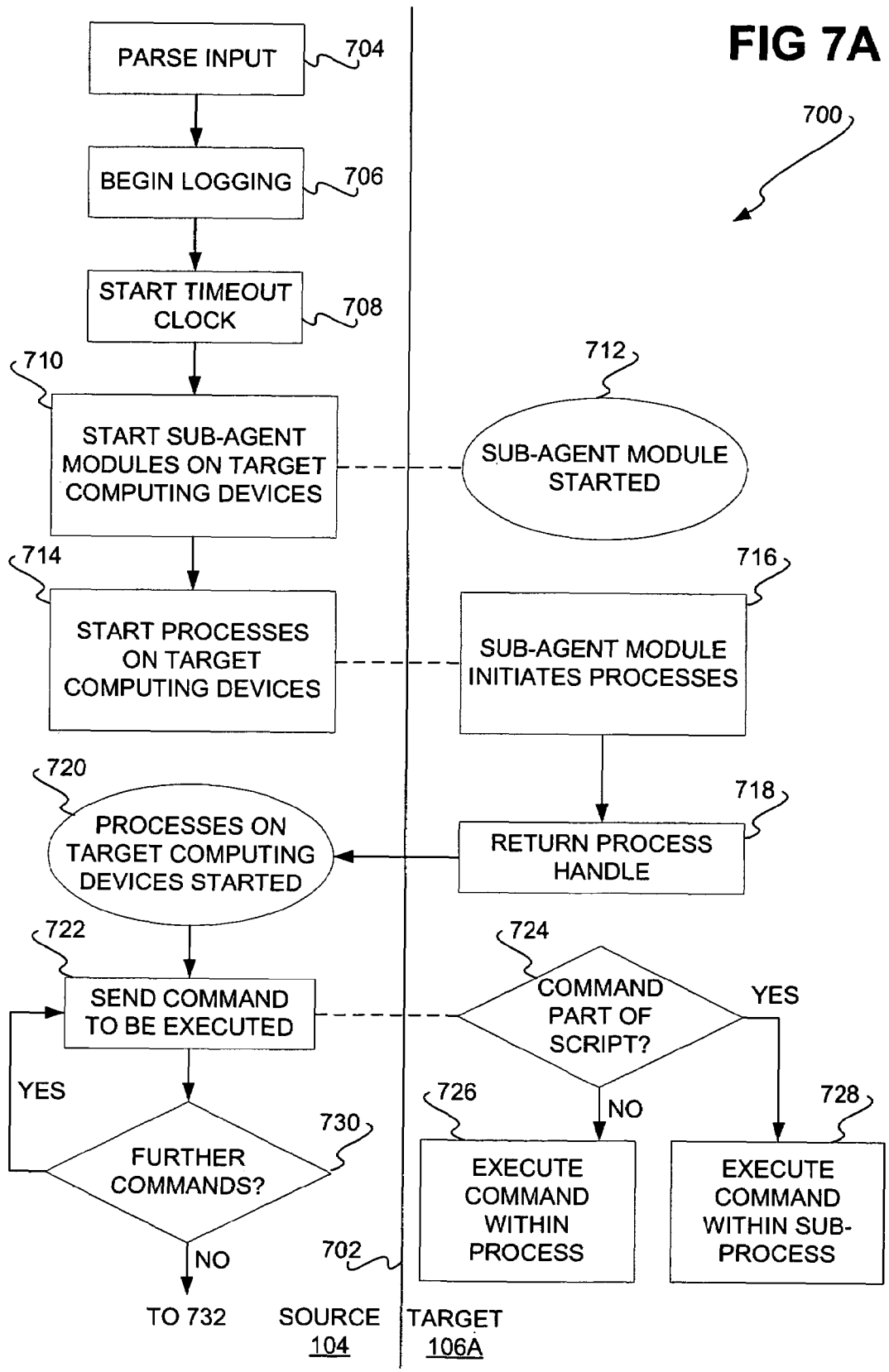

CONTROLLING TIMING OF EXECUTION OF TEST INSTRUCTION BY TARGET COMPUTING DEVICE

FIELD OF THE INVENTION

The present invention relates generally to testing target computing devices by spawning test processes on the target computing devices, and more particularly to controlling when test instructions within such test processes are executed at the target computing devices.

BACKGROUND OF THE INVENTION

Multiple-computing device systems are commonly employed within a variety of different organizations. A multiple-computing device system may include a number of server computing devices, or servers, a number of storage computing devices within a storage-area network (SAN), as well as a number of other types of computing devices. The computing devices are typically networked together, and may operate at least partially in unison to provide for fault tolerance, load balancing, and other types of functionality. Fault tolerance means that if one computing device fails, one or more additional computing devices are still available. Load balancing distributes the workload over multiple computing devices.

To ensure that the computing devices within a multiple-computing device system are operating correctly, testing of the computing devices may be performed. Testing of individual computing devices may be performed, as well as testing of the system as a whole. For example, testing may ensure that components of the individual computing devices are operating properly, as well as that the computing devices are interacting with one another properly so that the system as whole is operating properly. Where each computing device within a system is referred to as a target computing device, a source computing device may be communicatively connected to the system to control the test process. The target computing devices within the system may also be referred to as host computing devices, as well as by other terms.

Generally, the source computing device starts processes on the target computing devices. Once a process is started on a target computing device, it may collect information useful in determining whether the target computing device is operating properly. This information may include, for instance, acknowledgments that specific instructions have been properly executed on the target computing device, as well as the results of execution of such instructions. When the process is finished, it sends the information back to the source computing device, where the information can be examined, along with the information received from the other target computing devices.

Prior art testing methodologies enable the source computing device to control just when a process starts on a given target computing device. Once the process has been started on a target computing device, the source computing device is unable to control its execution, such that the process is executed in its entirety. That is, the source computing device is unable to control the process so that, for instance, different portions of the process are executed at different times, as desired by the source computing device.

For example, the source computing device may need to have each target computing device perform an initialization routine, and then test how one target computing device responds when another target computing device has been placed in a given state. The source computing device thus needs to have the latter target computing device enter a given state before the former target computing device continues executing its process. That is, the source computing device needs to synchronize the execution of the processes among the various target computing devices.

However, prior art testing methodologies do not enable the source computing device to control the execution of processes on target computing devices down to this needed level of granularity. That is, prior art testing methodologies do not allow the source computing device to control and synchronize the execution of processes on target computing devices once the processes have started. For this and other reasons, therefore, there is a need for the present invention.

SUMMARY OF THE INVENTION

The present invention relates generally to controlling the timing of execution of test instructions by a target computing device. A method of one embodiment of the invention initiates a test process at each target computing device. The method receives a process handle of the test process from each target computing device, as generated at the target computing device. The method repeats sending to each target computing device the process handle of the test process, and a test instruction to be executed at the target computing device, until the target computing device has finished executing all the test instructions. A test instruction may be a test script made up of a number of test commands that are to be executed as a group, or a test instruction may be a single test command. Timing of execution of each test instruction can thus be controlled by deciding when to send the test instruction to a target computing device.

A system of an embodiment of the invention includes a number of target computing devices to be tested, and a source computing device. The source computing device is to test the target computing devices by controlling execution of a number of test instructions for each target computing device. The source computing device controls execution of the test instructions on an instruction-by-instruction basis.

An article of manufacture of an embodiment of the invention includes a computer-readable medium and means in the medium. The means is for controlling when each of a number of test instructions, for each of a number of target computing devices, is to be executed. As such, the means synchronizes execution of the test instructions among the target computing devices.

Embodiments of the invention provide for advantages over the prior art. Whereas the prior art allows a source computing device to only control when a process is started at each target computing device, embodiments of the invention allow a source computing device to control when instructions within the process are executed at each target computing device. That is, embodiments of the invention enable a source computing device to control the timing of test instruction execution by the target computing devices. As such, execution of test instructions among the target computing devices can be synchronized. More complete and better testing of target computing devices within a multiple-computing device system is thus achieved.

Still other advantages, aspects, and embodiments of the invention will become apparent by reading the detailed description that follows, and by referring to the accompanying drawings.

BRIEF DESCRIPTON OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 7A and 7B are flowcharts of a specific example implementation of a method for testing target computing devices by a source computing device, where the source computing device is able to control testing on an instruction-by-instruction basis, according to a particular embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

OVERVIEW, SYSTEM, AND METHOD

Figure 1:
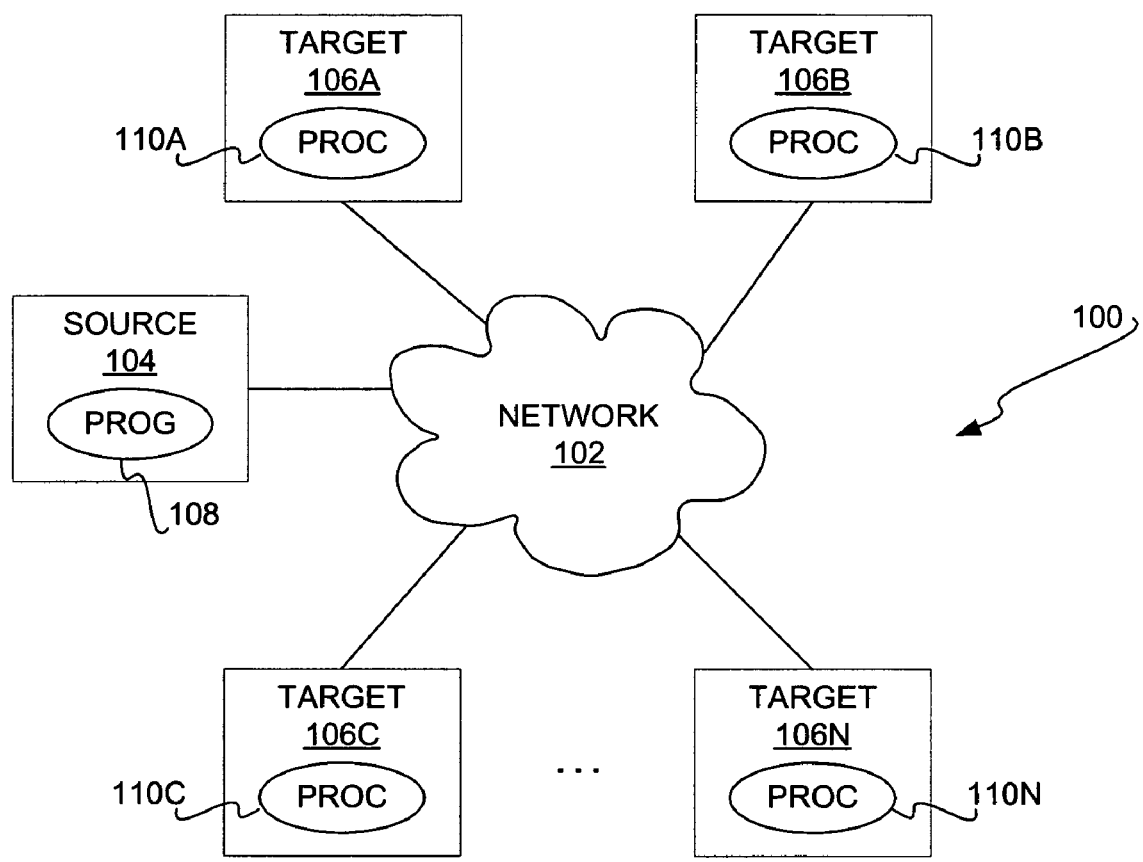
FIG. 1 is a diagram of a multiple-target computing device system including a source computing device and a number of target computing devices, according to an embodiment of the invention.

FIG. 1 shows a system 100 including a network 102, a source computing device 104, and a number of target computing devices 106A, 106B, ..., 106N, collectively referred to as the target computing devices 106, according to an embodiment of the invention. The network 102 may include one or more of: local-area networks (LAN's), wide-area networks (WAN's), intranets, extranets, the Internet, wired networks, wireless networks, and telephony networks, as well as other types of networks. The network 102 enables the target computing devices 106 to communicate with one another, and the source computing device 104 to communicate with the target computing devices 106 and vice-versa.

Each of the target computing devices 106 is more generally a node, where a node may generally and non-restrictively refer to one or more computing devices in one embodiment of the invention. Each of the target computing devices 106 can be also more specifically a server computing device, or a storage computing device. A server computing device, or server, is generally a computing device that is shared by a number of users on their own client computing devices. A storage computing device is generally a computing device that includes storage, such as a hard disk drive, which together with the storages of other storage computing devices provides a storage system, such as a storage-area network (SAN). Whereas four target computing devices 106 are depicted in FIG. 1, there can be more or less than four such target computing devices 106.

Similarly, the source computing device 104 is a computing device. The source computing device 104 tests the target computing devices 106 to ensure that they are operating properly. As such, the source computing device 104 has a test computer program 108 running thereon for this purpose. The computer program 108 causes test processes 110A, 110B, 110C, ..., 110N, collectively referred to as the test processes 110, to start on the target computing devices 106. A process is the unique instance of a particular piece or section of computer-executable code on a specific target computing device. The testing of the target computing devices 106 is controlled by the source computing device 104 and accomplished via the test processes 110. That is, the test computer program 108 of the source computing device 104 controls the test processes 110 of the target computing devices 106 to achieve and manage testing of the target computing devices 106.

Figure 2:
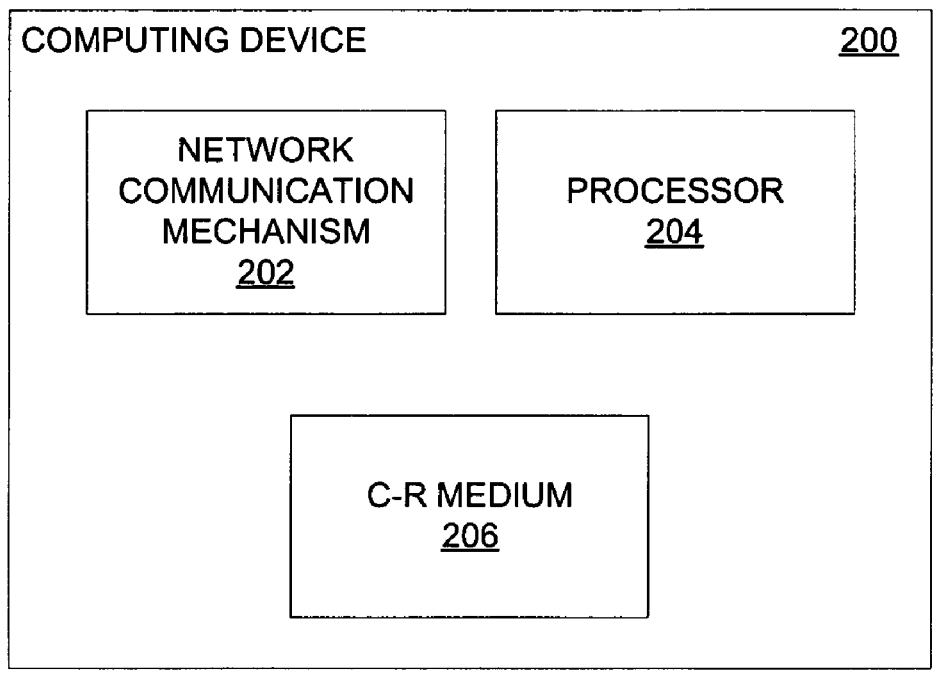
FIG. 2 is a diagram of a representative computing device, which can implement any of the target computing devices or the source computing device of the system of FIG. 1, according to an embodiment of the invention.

FIG. 2 shows a representative computing device 200 that may implement any or all of the target computing devices 106 of FIG. 1, as well as the source computing device 104 of FIG. 1, according to an embodiment of the invention. The computing device 200 is specifically depicted in FIG. 2 as including a network communication mechanism 202, a processor 204, and a computer-readable medium 206. However, as can be appreciated by those of ordinary skill within the art, the computing device 200 may include other components in addition to and/or in lieu of those depicted in FIG. 2.

The network communication mechanism 202 permits the computing device 200 to communicate with other computing devices over a network, such as the network 102 of FIG. 1. For instance, the network communication mechanism 202 may be or include a network adapter. The processor 204 may include one or more processors that are able to execute commands to achieve desired functionality. The computer-readable medium 206 may be or include semiconductor memory, optical media, magnetic media, volatile media, and/or non-volatile media. The medium 206 may store a computer program, such as the computer program 108 of FIG. 1, and/or a process, such as any of the processes 110 of FIG. 1, which are executable by the processor 204. The medium 206 may further store data created and used by such computer programs and processes.

Figure 3:
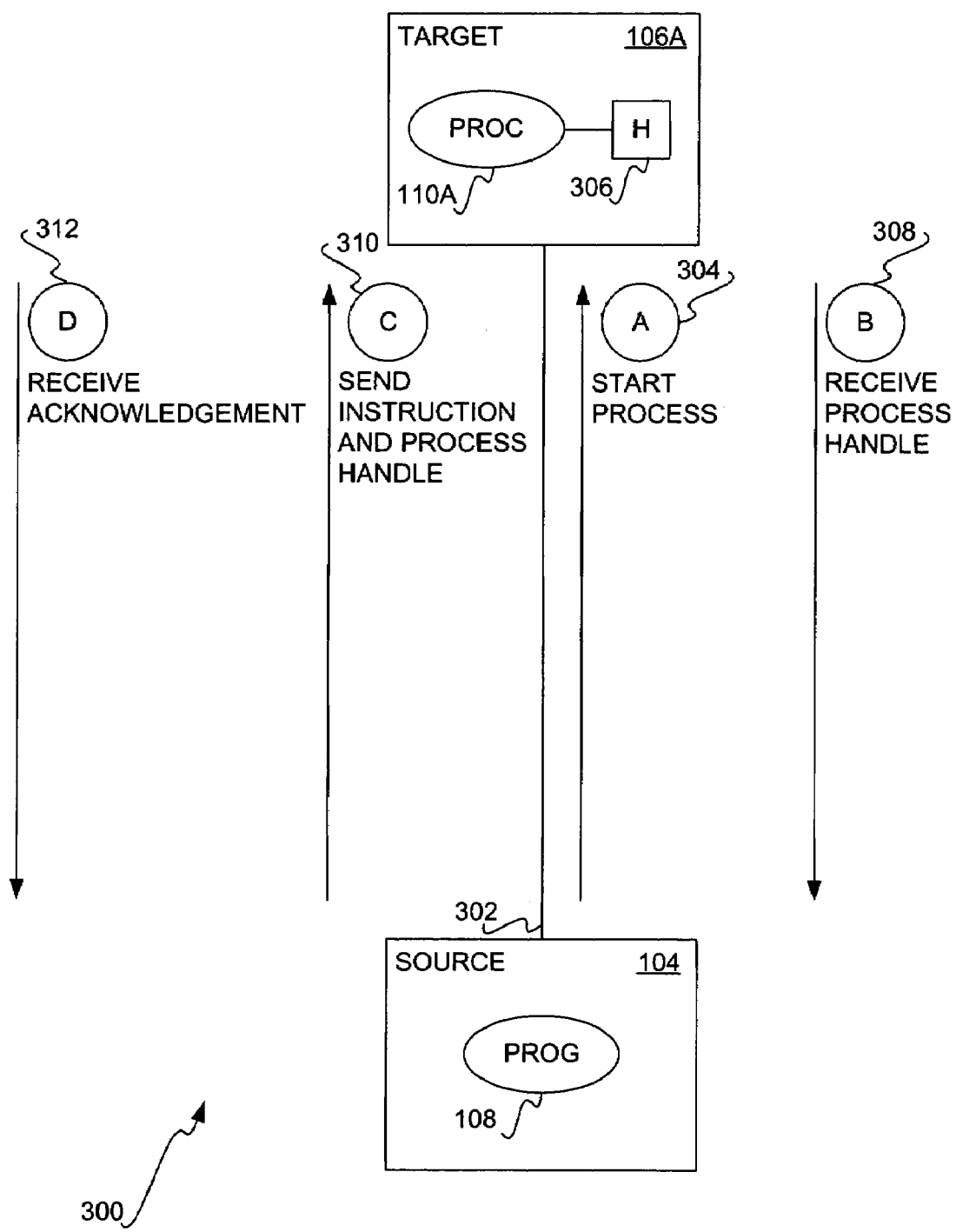
FIG. 3 is a diagram of an example scenario depicting the starting of a process by a source computing device on a target computing device, and the sending of an instruction by the source computing device for execution within the process on the target computing device, according to an embodiment of the invention.

FIG. 3 shows an example scenario 300 in which the source computing device 104 starts and controls the test process 110A on the target computing device 106A, according to an embodiment of the invention. Only the target computing device 106A is depicted in FIG. 3 for example purposes. Furthermore, the line 302 between the source computing device 104 and the target computing device 106A represents the communicative connection between the devices 104 and 106A, such as through the network 102 of FIG. 1. The example scenario 300 is meant to provide an overview of the procedure by which the source computing device 104 is able to control the test process 110A on an instruction-by-instruction basis, or level of granularity.

The test computer program 108 on the source computing device 104 first starts the test process 110A on the target computing device 106A, as indicated by the letter A 304. Prior to the source computing device 104 starting the process 110A on the target computing device 106A, the test process 110A does not exist on the target computing device 106A. Furthermore, the creation or starting procedure of the test process 110A results in the generation of a unique identifying process handle 306 associated with the test process 110A. A process handle is a unique temporary name or number assigned to a process, so that a computing device is able to easily identify the process. The target computing device 106A sends the process handle 306 back to the source computing device 104, which receives and stores the process handle 306, as indicated by the letter B 308.

The source computing device 104, via its computer program 108, next controls execution of the process 110A on the target computing device 106A as follows. When the source computing device 104 desires the process 110A on the target computing device 106A to continue execution, it sends the target computing device 106A the instruction to be executed by or within the process 110A, as well as the process handle 306 of the process 110A, as indicated by the letter C 310. The source computing device 104 sends the target computing device 106A the process handle 306 so that the target computing device 106A is able to identify in the context of which process running thereon it is to execute the instruction also sent by the source computing device 104. It is noted that in at least some embodiments of the invention, more than one process can be initiated by the source computing device 104 to run on a given target computing device, such as the target computing device 106A.

By sending the target computing device 106A the instruction when it is to be executed by the target computing device 106A, within the context of the process 110A, the source computing device 104 is able to control the timing of execution of the process 110A. That is, sending instructions to the target computing device 106A as they are to be executed by the target computing device 106A enables the source computing device 104 to control execution of the process 110A, and thus to synchronize execution of the process 110A with the processes running on other target computing devices. The target computing device 106A sends the source computing device 104 acknowledgement that the instruction has been executed within the process 110A, and the source computing device 104 thus receives the acknowledgment, as indicated by the letter D 312.

The procedure indicated by the letters A 304 and B 308 is performed once. By comparison, the procedure indicated by the letters C 310 and D 312 is performed for each instruction to be executed at the target computing device 106. The procedure indicated by the letters A 304 and B 308 starts the process 110A on the target computing device 106A. Execution of the process 110A is then subsequently controlled by the source computing device 104 by repeated performance of the procedure indicated by the letters C 310 and D 312. It is the procedure indicated by the letters C 310 and D 312 that enables the source computing device 104 to control the execution of the process 110A on the target computing device 106A.

Figure 4A:
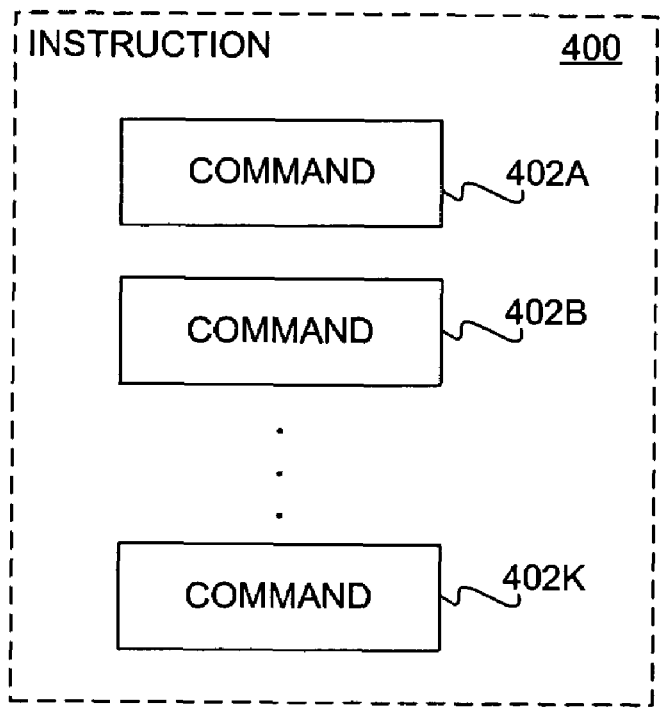
FIGS. 4A and 4B are diagrams of different types of instructions, where one type of instruction is made up of a group of commands, and another type of instruction is made up of a single command, according to varying embodiments of the invention.
Figure 4B:
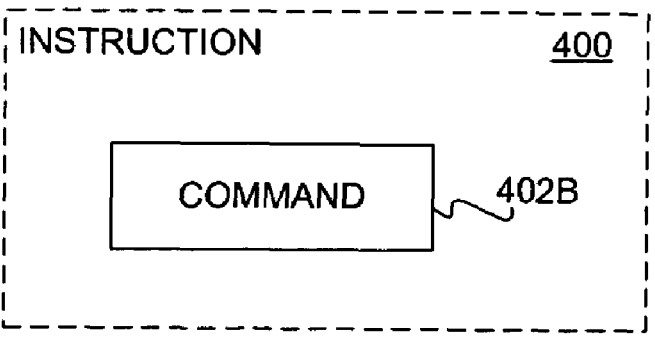

FIGS. 4A and 4B show different types of an instruction 400 that can be sent by the source computing device 104 to one of the target computing devices 106 for execution within the context of one of the processes 110, according to varying embodiments of the invention. In FIG. 4A, the instruction 400 includes a number of commands 402A, 402B, . . . , 402K, collectively referred to as the commands 402. By comparison, in FIG. 4B, the instruction includes a single command 402B.

For purposes of the present invention, an instruction is that which is specifically sent from the source computing device 104 to the target computing device 106 on an individual basis, where an instruction may in varying embodiments include one command or more than one command. By comparison, for purposes of the present invention, a command is that which is specifically executed or performed by the target computing device 106, and there can be more than one command for a given instruction. The distinction between a command and an instruction is made to distinguish that, while the source computing device 104 controls execution of the processes 110 on the target computing devices 106 on an instruction-by-instruction basis, each such instruction can actually indicate that the target computing devices 106 are to perform or execute a series of commands.

However, the utilization of the specific nomenclature "instruction" to refer to what is sent on an individual basis to the target computing device 106, and of the specific nomenclature "command" to refer to what is actually executed by the target computing device 106 and more than one of which can be encompassed by a given instruction, is arbitrary. That is, other than distinguishing between what is a command and what is an instruction, no other inference or implication should be drawn from calling a command a command and calling an instruction an instruction. For example, a command could have just as easily been called an instruction, and vice-versa.

In FIG. 4A, the instruction 400 thus can be considered a script made up of a number of commands 402. By sending all of the commands 402 as a single instruction 400 to a given target computing device, the source computing device 104 is indicating to the target computing device in question to execute the commands 402, in order, and, in one embodiment of the invention, atomically. Atomic execution of the commands 402 means that all of the commands 402 are executed, or none of them are executed.

Grouping the commands 402 within a single instruction 400 enables the source computing device 104 to not have to send each of the commands 402 individually to the target computing device. For instance, the source computing device 104 may need to control just when execution of the commands 402 begins, in order, and not when each of the commands 402 is particularly executed. As such, the source computing device 104 is still able to control execution of the process within the context of which the commands 402 are executed, but is able to group the commands 402 within a single instruction 400 when doing so is convenient and efficient for the source computing device 104.

By comparison, in FIG. 4B, the instruction 400 includes a single command 402B. By sending a single command 402B as a single instruction 400 to a given target computing device, the source computing device 104 is indicating to the target computing device in question to execute the single command 402B atomically in one embodiment. By sending some instructions as the instruction 400 of FIG. 4A that is made up of a number of commands 402, and by sending other instructions as the instruction 400 of FIG. 4B that is made up of a single command 402B, the source computing device 104 is able to control execution of the test process on the target computing device in question with the level of granularity needed for different commands. For example, where certain commands are to be individually executed at certain times, the source computing device 104 sends those commands as individual instructions. As another example, where other commands do not have to be individually executed at certain times, the source computing device 104 may send those commands as a group within a single instruction.

Figure 5:
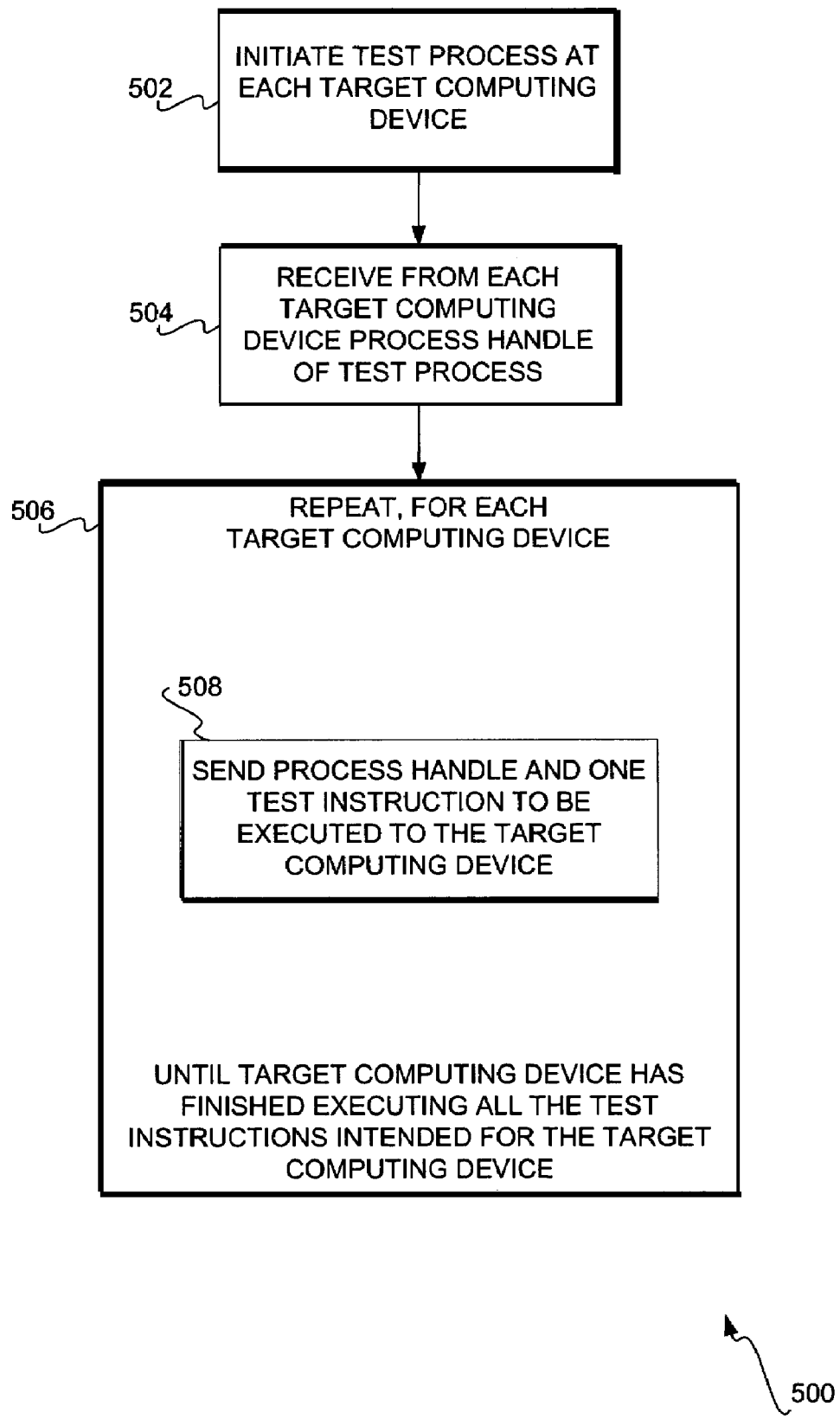
FIG. 5 is a flowchart of a method for testing target computing devices by a source computing device, where the source computing device is able to control testing on an instruction-by-instruction basis, according to an embodiment of the invention.

FIG. 5 shows a method 500 for performance by the source computing device 104 relative to the target computing devices 106, to test the target computing devices 106, according to an embodiment of the invention. In one embodiment, the method 500 may be performed by the processor 204 of the source computing device 104 executing the computer program 108 from the computer-readable medium 206 of the source computing device 104. The method 500 enables the source computing device 500 to synchronization execution of test instructions among the target computing devices 106, by controlling when each such test instruction is executed by a given target computing device.

The source computing device 104 first initiates a test process at each target computing device (502). For instance, the test process 110A is initiated at the target computing device 106A, the test process 110B is initiated at the target computing device 106B, and so on. The source computing device 104 next receives from each target computing device the process handle of the test process created at that target computing device (504). The process handle for the test process created at a given target computing device is generated at the target computing device as a result of the creation and/or initiation procedure performed to create and/or initiate the test process.

For each target computing device, the following is then repeated until each target computing device has finished executing all the test instructions intended for it (506). The source computing device specifically sends the process handle for the process of a given target computing device, and the test instruction to be executed by this target computing device within the context of that process, to the target computing device (508). Sending the process handle enables the target computing device in question to know in the context of which process the test instruction that is also being sent should be executed. Each test instruction, as has been described, may include one command, or more than one command, to be executed by a target computing device.

The totality of all the test instructions to be executed by each target computing device make up the testing to be conducted on each target computing device. Having the source computing device control when to send test instructions to target computing devices permits the source computing device to control the timing of the execution of the test processes on the target computing devices, on an instruction-by-instruction basis. As a result, the source computing device is able to synchronize the execution of the processes over all the target computing devices. For instance, the source computing device may not send a specific test instruction to one target computing device until another target computing device has already executed a different test instruction to place the latter target computing device into a desired state in the context of, or relative to, which the former target computing device is to execute its test instruction. Testing of the system 100 of target computing devices 106 as a whole can thus be controlled.

SPECIFIC EXAMPLE IMPLEMENTATION

Figure 6:
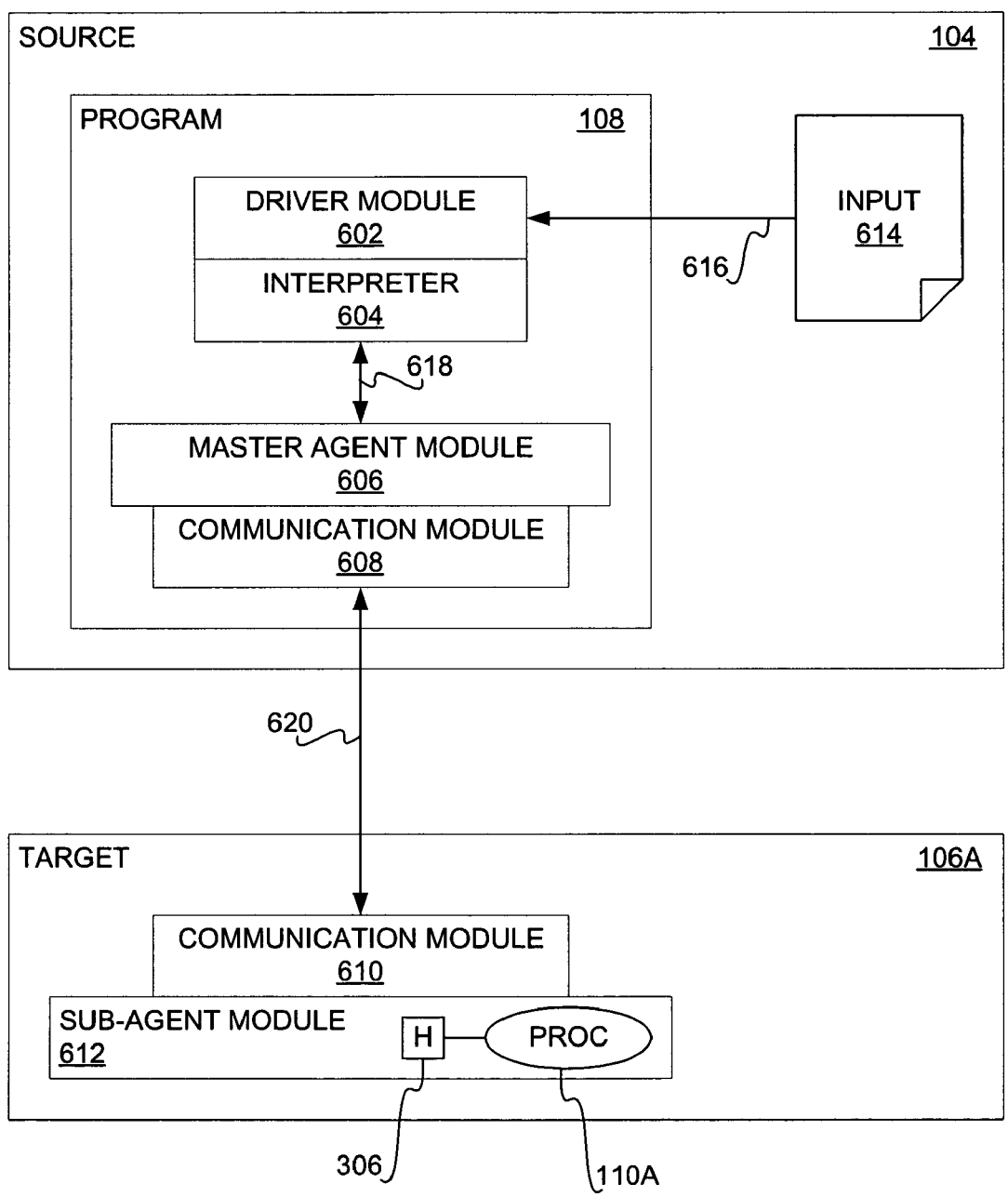
FIG. 6 is a diagram of a specific example implementation of a system having a source computing device and at least one target computing device, according to a particular embodiment of the invention.

FIG. 6 shows a specific example implementation of the system 100, according to a particular embodiment of the invention. For illustrative and descriptive clarity, only the source computing device 104 and the target computing device 106A are depicted in FIG. 6. The target computing devices 106B, 106C, and 106N of FIG. 1, as well as the network 102 of FIG. 1, by comparison, are not shown in FIG. 6. The target computing device 106A as depicted in FIG. 6 is representative of all the target computing devices 106. Furthermore, the source computing device 104 and the target computing device 106A communicate with one another over the network 102, although the network 102 is not particularly shown in FIG. 6.

The source computing device 104 includes a driver module 602, an interpreter 604, a master agent module 606, and a communication module 608, all of which can be a part of the computer program 108 in one embodiment of the invention. Somewhat similarly, the target computing device 106A includes a communication module 610 and a sub-agent module 612. The process 110A, having the process handle 306, is run within the context of the sub-agent module 612. The communication module 610 and the sub-agent module 612 may be a part of a computer program running on the target computing device 106A, although this is not specifically shown in FIG. 6. Furthermore, the modules 602, 606, 608, and the interpreter 604 of the source computing device 104, as well as the modules 610 and 612 of the target computing device 106A, may each be considered one or more sections of computer-executable code, such as computer software objects, routines, sub-routines, and so on.

The driver module 602 coordinates all test instructions. The driver module 602 in this respect is able to receive input 614, as indicated by the arrow 616, in the form of user-entered instructions via a command-line prompt or other user interface (viz., user input), or in the form of a previously generated file, such as a script file containing a number of instructions (viz., input file). The driver module 602 thus arranges for parsing of the input 614, arranges for execution of commands on the target computing device 106A, and monitors the commands that have been executed on the target computing device 106A. The driver module 602 further collects information regarding the commands that have been executed on the target computing device 106A, such as information regarding the results of the execution of such commands. The driver module 602 also controls the integrity of the system 100, by terminating any processes running on target computing devices that have become abnormal, as is more specifically described later in the detailed description.

The interpreter 604 is used by the driver module 602 to parse the input 614, and convert the instructions of the input 614 into commands that are executable on the target computing device 106A. The instructions may be defined within predetermined language constructs. The interpreter 604 is in one embodiment expandable and extensible, in that additional functionality can be built onto the existing functionality, in order to interpret additional instructions. The interpreter 604 thus has the capability to generate actual commands based on instructions parsed from the input 614. The commands are eventually executed on the target computing device 106A.

In one embodiment, file system-oriented commands are supported by the interpreter 604. The file system-oriented commands can include: create file; remove or delete file; open file; close file; read from file; and, write to file. The file system-oriented commands can further include: seek a position within a file; acquire and release shared and exclusive file-range locks; and, acquire and release exclusive file locks. Additional file system-oriented commands can include: exit the process running on a target computing device; execute a command through a command-line interface; invoke operating system commands; and, acquire the identity of the operating system running on a target computing device.

The driver module 602 therefore uses the interpreter 604 to interpret the input 614, and has an interactive mode in which it is able to accept instructions entered by a user in real-time. By collecting and collating execution logs of the results received from execution of commands by the target computing device 106A, the driver module 602 is able to provide a unified view of the results of testing the target computing device 106A. Therefore, the driver module 602 tracks all the commands that are executed on the target computing device 106A. In the event that the process 110A of the target computing device 106A hangs indefinitely, the driver module 602 provides a timeout mechanism to terminate the process 110A. The driver module 602 also is able to terminate the process 110A if it becomes abnormal in other ways, such as becoming a runaway process that executes commands without instruction from the driver module 602, or an orphan process that no longer is associated with the handle 306 of the process 110A.

The master agent module 606 receives the commands interpreted from the instructions of the input 614 by the interpreter 604, as instructed by the driver module 602, and sends the commands to the target computing device 106A through the communication module 608. The master agent module 606 is communicatively connected to the interpreter 604, as indicated by the arrow 618. The master agent module 606 is thus the module that controls the communication module 608 to send commands to the target computing device 106A. The communication module 608 provides the communication mechanism between the source computing device 104 and the target computing device 106A. For every communication sent by the communication module 608 to the target computing device 106A, an acknowledgment is received by the communication module 608 from the target computing device 106A. The communication module 608 is responsible for processing these acknowledgments.

The communication module 610 of the target computing device 106A receives the commands sent by the communication module 608 of the source computing device 104, and is responsible for routing these commands to the sub-agent module 612. The communication module 610 is thus communicatively connected to the communication module 608, as indicated by the arrow 620. The communication module 610 is also responsible for sending acknowledgments back to the communication module 608 upon receiving commands from the communication module 608, and for sending results of the commands executed on the target computing device 106A back to the source computing device 104.

The master agent module 606 of the source computing device 104 initially starts the sub-agent module 612 on the target computing device 106A. The process 110A, having the process handle 306, is executed within the context of the sub-agent module 612. The sub-agent module 612 is capable of executing operating system and other commands on the target computing device 106A, in the context of the process 110A, or a sub-process thereof. Thus, the master agent module 606 of the source computing device 104 is able to supervise execution of commands on the target computing device 106A via the sub-agent module 612 of the target computing device 106A.

For all the test computing devices, such as the test computing device 106A, the driver module 602 spawns sub-agent modules, such as the sub-agent module 612, through the master agent module 606. The driver module 602 then is able to request the sub-agent module 612 to initiate the process 110A, resulting in generation of the process handle 306 of the process 110A, through the master agent module 606. The driver module 602 therefore has a process—the process 110A—open on the target computing device 106A for testing the target computing device 106A.

The driver module 602 uses the communication module 608 to send commands to be executed on the target computing device 106A to the sub-agent module 612, through the communication module 610. The sub-agent module 612 uses the process handle 306 that has been opened to execute the commands. If the command is part of a script, then the sub-agent module 612 may fork a sub-process off the process 110A to execute the commands of the script. Because the process handle 306 remains open on the target computing device 106A, and is known to the source computing device 104, the driver module 602 is able to synchronize commands executed on the target computing device 106A with commands executed on other target computing devices. For every command executed, the sub-agent module 612 sends the results thereof, including any execution logs, back to the driver module 602. Once all commands have been executed, the driver module 602 instructs the sub-agent module 612, via the master agent module 606, to close the process 110A and stop running.

Figure 7B:
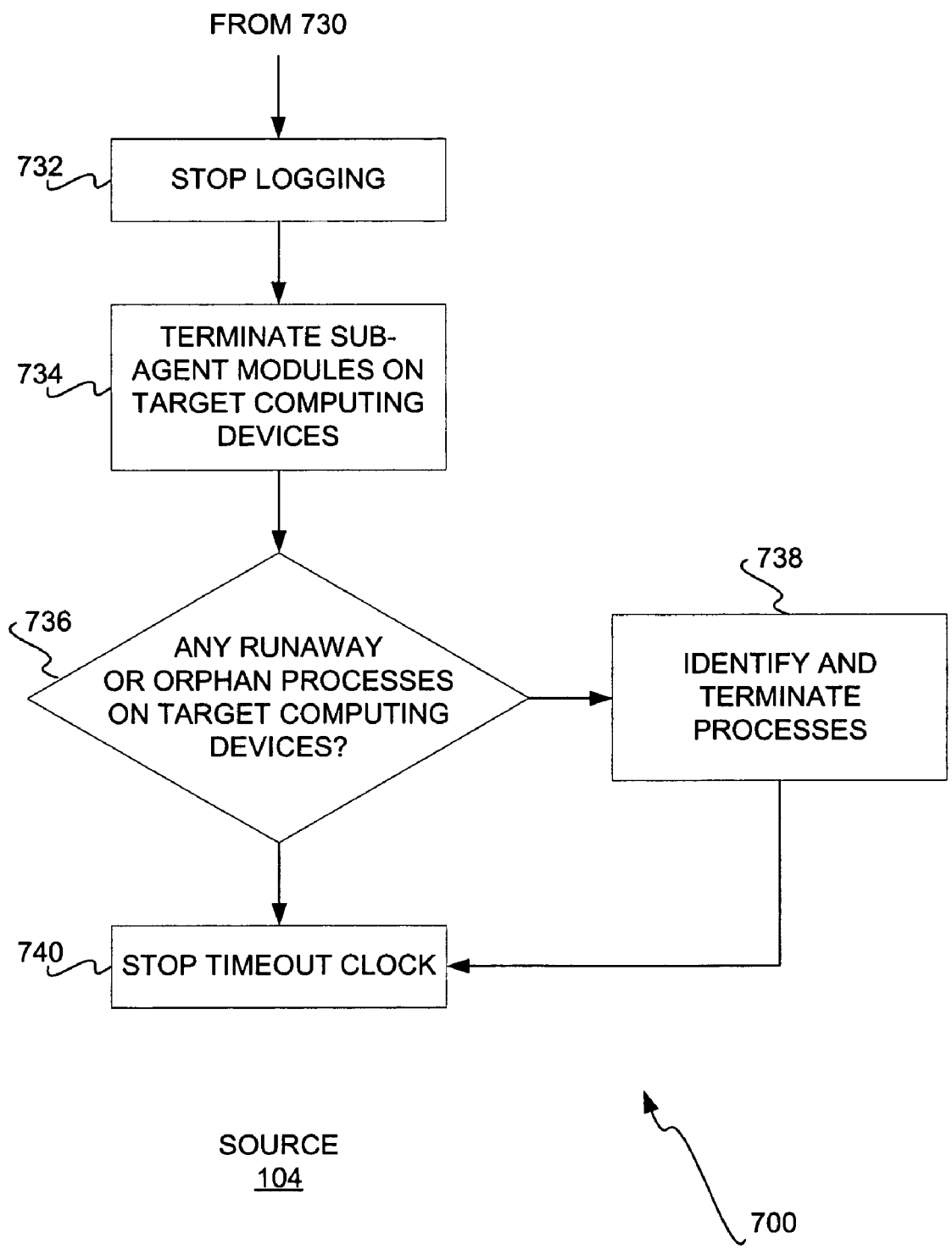

FIGS. 7A and 7B show a specific example implementation of a method 700 for testing target computing devices within the system 100 of FIG. 6, according to a particular embodiment of the invention. For illustrative and descriptive convenience, the method 700 is described in relation to the source computing device 104 and a single target computing device 106A. However, execution of the method 700 relative to the target computing device 106A is representative of execution of the method 700 as to all the target computing devices 106. The method 700 is divided in FIG. 7A by a vertical line 702 that separates those parts of the method 700 in FIG. 7A that are performed by the source computing device 104 and those parts of the method 700 in FIG. 7A that are performed by the target computing device 106A. All of the parts of the method 700 in FIG. 7B are performed by the source computing device 104.

The source computing device 104 first parses the input 614 (704), such as that which may be directly entered by a user, or that which may have been previously stored within an input file. Parsing the input determines the test instructions, and converts them into commands that can be executed by the target computing device 106A. The source computing device 104 also begins logging the results of the testing procedure of the method 700 (706), which includes storing the results of execution of the commands by the target computing device 106A. A timeout clock is started by the source computing device 104 (708), so that any processes and sub-processes created as a result of the testing procedure of the method 700 on the target computing device 106A can be identified and terminated if they become orphan, runaway, or another abnormal type of process.

The source computing device 104 starts a sub-agent module on the target computing devices (710). For instance, on the target computing device 106A, the sub-agent module 612 is started (712). The source computing device 104 next starts test processes on the target computing devices (714). For instance, on the target computing device 106A, the sub-agent module 612 initiates the test process 110A (716), which results in generation of the process handle 306. The target computing device 106A returns the process handle 306 to the source computing device 104 (718), which then knows that the process 110A has been started on the target computing device 106A (720).

The source computing device 104 sends the first command to be executed by the target computing device 106A, along with the process handle 306 identify the process 110A in the context of which command is to be executed, to the target computing device 106A (722). If the command is part of a script of commands (724), then the sub-agent module 612 executes the command within a sub-process for that script (728), where the sub-agent module 612 creates the sub-process when the first command of the script is received. If the command is not part of a script (724), then the sub-agent module 612 executes the command within the process 110A (726), as opposed to within a sub-process of the process 110A.

If there are further commands to be executed (730), then the source computing device 104 sends the next command to the target computing device 106A, along with the process handle 306, as before (722). Ultimately, once all of the commands have been executed (730), the source computing device 104 stops logging the results of execution of the commands (732). That is, results of execution of the commands in 726 and 728 by the sub-agent module 612 of the target computing device 106A are returned to and logged by the source computing device 104, as represented by the start of the logging process in 706, and as represented by the ending of the logging process in 732.

The source computing device 104 next terminates the sub-agent modules on the target computing devices 110 (734). For instance, the source computing device 104 terminates the sub-agent module 612 on the target computing device 110A. As part of the termination procedure, the sub-agent module 612 first attempts to stop the process 110A running thereon, and any sub-processes of the process 110A, so that all processes associated with the testing method 700 of FIG. 7 have desirably been removed from the target computing device 110A.

However, abnormal processes associated with the testing method 700 of FIG. 7 may occasionally remain on the target computing device 110A. Such abnormal processes can include runaway processes that continue to execute commands, and do not respond to termination requests, as well as orphan processes that no longer are properly associated with the handle 306. Such processes may result from the target computing device 110A not properly operating. Attempts by the sub-agent module 612 to stop these processes may fail. Therefore, if any such processes remain (736), the source computing device 104 identifies and terminates these processes itself (738).

The source computing device 104 is able to identify such processes because they are processes that have been started on the target computing devices after the timeout clock was started in 708, and have timed out due to the inability of the sub-agent modules to terminate them. The source computing device 104 is able to terminate the abnormal processes on the target computing devices 110 where the sub-agent modules have failed to do so, because the source computing device 104 may have supervisory control over the target computing devices 110, and thus is able to terminate any process on the devices 110. Ultimately, the method 700 is finished by the source computing device 104 stopping the timeout clock that enabled the device 104 to identify any abnormal processes (740).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

What is claimed is:

1. A method comprising:

initiating a test process at each of a plurality of target computing devices;

receiving a process handle of the test process from each target computing device as generated at the target computing device;

just at a time when a given sub-plurality of commands of a plurality of commands do not have to be individually executed at particular times, sending the given sub-plurality of commands as part of a single test instruction to a particular target computing device, along with the process handle of the test process of the particular target computing device, such that just a time when the particular target computing device begins execution of the given sub-plurality of commands is controlled and a time when the particular target computing device executes each of the given sub-plurality of commands is not controlled, the particular target computing device executing all the given sub-plurality of commands within a sub-process of the test process, such that the given sub-plurality of commands is not otherwise sent to the particular target computing device, and such that the time when the particular target computing device begins execution of the given sub-plurality of commands is a time when the given sub-plurality of commands is sent to the particular target computing device as part of the single test instruction; and, just at a time when a given command of the plurality of commands has to be executed individually at a particular time, sending the given command as an only part of a single test instruction to a particular target computing device, along with the process handle of the test process of the particular target computing device, such that a time when the particular target computing device begins execution of the given command is controlled, the particular target computing device executing the given command within the test process, such that the given command is not otherwise sent to the particular target computing device, and such that the single test instruction includes only the given command and no other commands, wherein timing of execution of each test instruction by a target computing device is able to be controlled by deciding when to send the test instruction to the target computing device.

2. The method of claim 1, wherein execution of the test instructions among the target computing devices is synchronized by controlling a time when each test instruction is executed by a target computing device.

3. The method of claim 1, further comprising parsing input to determine the plurality of test instructions to be executed by each target computing device.

4. The method of claim 1, further comprising initiating a sub-agent at each target computing device to initiate the test process and execute the plurality of test instructions for the target computing device.

5. The method of claim 4, further comprising terminating the sub-agent at each target computing device upon the target computing device having executed the plurality of test instructions for the target computing device.

6. The method of claim 1, further comprising logging results of execution of the plurality of test instructions for each target computing device.

7. The method of claim 1, further comprising:
starting a timeout clock prior to each target computing device beginning execution of the plurality of test instructions; and,
identifying and terminating any runaway and orphan processes on the target computing devices that have timed out on the target computing devices.

8. The method of claim 1, wherein the method is performed by a source computing device not part of the plurality of target computing devices.

9. A system comprising:
a plurality of target computing devices to be tested; and,
a source computing device to test the target computing devices by controlling execution of a plurality of test instructions for each target computing device on an instruction-by-instruction basis,
wherein a plurality of commands to be executed by the target computing devices are organized within the plurality of test instructions, such that:
just at a time when a given sub-plurality of commands of the plurality of commands do not have to be individually executed at particular times, the given sub-plurality of commands as part of a single test instruction is sent to a particular target computing device, along with the process handle of the test process of the particular target computing device, such that just a time when the particular target computing device begins execution of the given sub-plurality of commands is controlled and a time when the particular target computing device executes each of the given sub-plurality of commands, the particular target computing device executing all the given sub-plurality of commands within a sub-process of the test process is not controlled, such that the given sub-plurality of commands is not otherwise sent to the particular target computing device, and such that the time when the particular target computing device begins execution of the given sub-plurality of commands is a time when the given sub-plurality of commands is sent to the particular target computing device as part of the single test instruction; and,
just at a time when a given command of the plurality of commands has to be executed individually at a particular time, the given command as an only part of a single test instruction is sent to a particular target computing device, along with the process handle of the test process of the particular target computing device, such that a time when the particular target computing device begins execution of the given command is controlled, the particular target computing device executing the given command within the test process, such that the given command is not otherwise sent to the particular target computing device, and such that the single test instruction includes only the given command and no other commands.

10. The system of claim 9, wherein the source computing device starts a test process at each target computing device via which the test instructions for the target computing device are executed, each target computing device returning a process handle of the test process to the source computing device for the source computing device to send back to the target computing device with each test instruction to be executed by the target computing device.

11. The system of claim 10, wherein each target computing device comprises a sub-agent module and the source computing device comprises an agent module, the agent module starting the test process at each target computing device through the sub-agent module thereof, the sub-agent module of each targeting computing device returning the process handle of the test process to the agent module of the source computing device.

12. The system of claim 9, wherein the source computing device comprises a driver module to cause the test instructions for each target computing device to be executed and to monitor execution of the test instructions at the target computing device.

13. The system of claim 9, wherein the source computing device comprises an interpreter module to convert one or more of user input and an input file into the plurality of test instructions for each target computing device.

14. The system of claim 9, wherein the source computing device comprises a communication module by which the source computing device communicates with the target computing devices, and each target computing device comprises a communication module by which the target computing device communicates with the source computing device.

15. An article of manufacture comprising:
a computer-readable medium; and,
means in the medium for controlling when each of a plurality of test instructions for each of a plurality of target computing devices is to be executed by the target computing devices to synchronize execution of the test instructions among the target computing devices,
wherein a plurality of commands to be executed by the target computing devices are organized within the plurality of test instructions, such that:
just at a time when a given sub-plurality of commands of the plurality of commands do not have to be individually executed at particular times, the given sub-plurality of commands as part of a single test instruction is sent to a particular target computing device, along with the process handle of the test process of the particular target computing device, such that just a time when the particular target computing device begins execution of the given sub-plurality of commands is controlled and at a time when the particular target computing device executes each of the given sub-plurality of commands, the particular target computing device executing all the given sub-plurality of commands within a sub-process of the test process is not controlled, such that the given sub-plurality of commands is not otherwise sent to the particular target computing device, and such that the time when the particular target computing device begins execution of the given sub-plurality of commands is a time when the given sub-plurality of commands is sent to the particular target computing device as part of the single test instruction; and,
just at a time when a given command of the plurality of commands has to be executed individually at a particular time, the given command as an only part of a single test instruction is sent to a particular target computing device, along with the process handle of the test process of the particular target computing device, such that a time when the particular target computing device begins execution of the given command is controlled, the particular target computing device executing the given command within the test process, such that the given command is not otherwise sent to the particular target computing device, and such that the single test instruction includes only the given command and no other commands.

16. The article of manufacture of claim 15, wherein the means is further for sending a process handle of a test process with each test instruction to a target computing device for the target computing device to identify the test process via which the test instruction is to be executed by the target computing device.

17. A method comprising:
   receiving communication from a host computing device to start a test process;
   starting the test process, resulting in generation of a process handle for the test process;
   sending the process handle to the source computing device;
   receiving the process handle of the test process and a test instruction from the host computing device;
   just at a time when the test instruction encompasses a given plurality of commands, executing the given plurality of commands, such that just a time when execution of the given plurality of commands begins is controlled and a time when execution of each of the given plurality of commands is not controlled, all the given plurality of commands being executed within a sub-process of the test process, such that the given plurality of commands is not otherwise received from the host computing device, and such that a time when a particular target computing device begins execution of the given sub-plurality of commands is a time when the given sub-plurality of commands is sent to the particular target computing device as part of the single test instruction; and,
   just at a time when the test instruction encompasses a single command, the single command being an only command within the test instruction, executing the single command, such that a time when execution of the given command begins is controlled, the given command being executed within the test process, such that the given command is not otherwise received from the host computing device, and such that the test instruction includes only the single command and no other commands.

18. The method of claim 17, further comprising, prior to receiving communication from the host computing device to start the test process:
   receiving communication from the host computing device to start a sub-agent module; and,
   starting the sub-agent module,
   wherein the test process is started by the sub-agent module and the test instruction is executed within the test process by the sub-agent module.

* * * * *